(12) United States Patent
Wang et al.

(10) Patent No.: US 9,965,492 B1
(45) Date of Patent: May 8, 2018

(54) USING LOCATION ALIASES

(71) Applicant: Google Inc., Mountain View, CA (US)

(72) Inventors: Bo Wang, Mountain View, CA (US); Omer Bar-or, Mountain View, CA (US); Pravir K. Gupta, Mountain View, CA (US); Yang Gao, Redwood City, CA (US); Nitin Mangesh Shetti, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 478 days.

(21) Appl. No.: 14/258,298

(22) Filed: Apr. 22, 2014

Related U.S. Application Data

(60) Provisional application No. 61/951,763, filed on Mar. 12, 2014.

(51) Int. Cl.
G06F 17/00 (2006.01)
G06F 17/30 (2006.01)

(52) U.S. Cl.
CPC .... *G06F 17/30241* (2013.01); *G06F 17/3087* (2013.01)

(58) Field of Classification Search
CPC .. G06F 17/3087; G06F 17/21; G06F 17/2247; G06F 17/278; G06F 17/30247; G06F 17/30268
See application file for complete search history.

(56) References Cited

U.S. PATENT DOCUMENTS 6,343,120 B1  1/2002  Rhodes
7,574,530 B2  8/2009  Wang
7,930,680 B2  4/2011  Dumitru
8,326,793 B1  12/2012 Bowers
8,401,771 B2  3/2013  Krumm
8,433,762 B1  4/2013  Wald (Continued)

FOREIGN PATENT DOCUMENTS

WO  WO2013010262 A1  1/2013
WO  WO2014022345 A3  4/2014

OTHER PUBLICATIONS

All Your Google Maps Searches in One Place, Google Lat Long, Sep. 19, 2012, 4 pages, downloaded from the internet on Apr. 9, 2014 http://google-latlong.blogspot.com/2012/09/all-your-google-maps-searches-in-one_9699.html.

(Continued)

*Primary Examiner* — Truong Vo
(74) *Attorney, Agent, or Firm* — Fish & Richardson P.C.

(57) ABSTRACT

Methods, systems, and apparatus, including computer programs encoded on a computer storage medium, for using location aliases. In some implementations, a query is received, and a user that submitted the query is identified. It can be determined that one or more terms of the query represent an alias for a user-specific geographical location that has not been designated for the identified user. In response, a prompt can be provided to the user to specify a geographical location corresponding to the one or more query terms, data indicating a geographical location is received, and data is stored that indicates that, for the identified user, the one or more terms are an alias for the geographical location. One or more search results responsive to the query are provided, where the alias corresponds to the geographical location input in response to the prompt.

22 Claims, 6 Drawing Sheets

(56) References Cited

U.S. PATENT DOCUMENTS

| | | |
|---|---|---|
| 8,473,289 B2 | 6/2013 | Jitkoff |
| 8,583,638 B2 | 11/2013 | Donelli |
| 8,594,996 B2 | 11/2013 | Liang |
| 8,601,070 B2 | 12/2013 | Liang |
| 8,630,663 B1 | 1/2014 | Hawkins |
| 2007/0192116 A1 | 8/2007 | Lovitt |
| 2009/0222438 A1 | 9/2009 | Strandell et al. |
| 2010/0217525 A1 | 8/2010 | King |
| 2012/0047147 A1 | 2/2012 | Redstone |
| 2013/0151950 A1* | 6/2013 | McEvilly ............ G06F 17/3087 715/234 |
| 2013/0232006 A1* | 9/2013 | Holcomb .......... G06F 17/30864 705/14.54 |
| 2013/0265450 A1 | 10/2013 | Barnes |

OTHER PUBLICATIONS

"An Easy Way to Access Directions and Locations You Care About," Google Lat Long, Feb. 14, 2012, 2 pages, downloaded from the internet on Apr. 9, 2014 http://google-latlong.blogspot.com/2012/02/easy-way-to-access-directions-and.html.

"Check-ins and Rating Places Get Easier with Google Maps 5.5 for Android," Google Lat Long, May 25, 2011, 3 pages, downloaded from the internet on Apr. 9, 2014 http://google-latlong.blogspot.com/2011/05/check-ins-and-rating-places-get-easier.html.

"Meet the New Google Maps: A Map for Every Person and Place," Google Lat Long, May 15, 2013, 6 pages, downloaded from the internet on Apr. 9, 2014 http://google-latlong.blogspot.com/2013/05/meet-new-google-maps-map-for-every.html.

"Quickly Access Your Home and Work Locations in Google Maps," Google Lat Long, May 15, 2012, 4 pages, downloaded from the internet on Apr. 9, 2014 http://google-latlong.blogspot.com/2012/05/quickly-access-your-home-and-work.html.

\* cited by examiner

USING LOCATION ALIASES

CROSS-REFERENCE TO RELATED APPLICATIONS

This application claims priority to U.S. Provisional Application No. 61/951,763, filed on Mar. 12, 2014, the entire contents of which are incorporated by reference herein.

BACKGROUND

This specification relates to using location aliases.

Internet search engines aim to identify resources (e.g., web pages, images, text documents, multimedia content) that are relevant to a user's needs and to present information about the resources in a manner that is useful to the user. Some search engines may provide information related to geographical locations, such as maps, navigation directions, or search results associated with locations.

SUMMARY

A search engine system can permit users to use aliases or nicknames to refer to geographical locations. When a user submits a query or other input to a search engine, it may be convenient for the user to enter a location alias rather than typing an address. For example, a user searching for a location near her home or work could refer to these locations as "home" or "work" rather than specifying the address in each query. The search engine system can store information that allows the search engine to determine the locations corresponding to different location aliases, and may use information about these locations to provide information in response to search queries.

Aliases may be defined for users individually, so that an alias represents a personalized location for a user. When an alias is used in a query, the search engine system may disambiguate the meaning of the alias to identify the location that the alias represents for the particular user that submits the query. For example, many users may use the word "home" to refer to the place where they reside, and "home" may represent a different location for each user. The search engine system may store or access data indicating a different "home" location for each user, allowing search results or other information provided by the search engine to be personalized for the specific user that submitted the search. In a similar manner, other aliases may represent other user-specified locations.

In some instances, a user may use an alias for a location in a query before the user specifies the location that the alias should represent. For example, a user may submit a query, "restaurants near my work," without having previously indicated what the user's "work" location is. In these instances, the search engine system may identify portions of the query that are intended to be an alias, and prompt the user to provide the location that corresponds to the alias. The location that the user provides can be used to generate search results for the query. The location may also be stored as the location corresponding to the alias for the user. When the user uses the alias again in a query, the search engine system will be able to determine the meaning of the alias without having to ask the user again.

Location aliases may be used in queries or other input, and may be disambiguated in any of variety of scenarios. For example, an alias may be detected in and the meaning of the alias may be determined for queries for searching Web documents or other document collections, requests for maps or navigation directions, voice commands or voice queries, queries requesting results near a specific place or in a particular geographical area, and other types of input.

In a general aspect, a method includes: receiving a query from a user; identifying the user that submitted the query; determining that one or more terms of the query represent an alias for a user-specific geographical location that has not been designated for the identified user; in response to determining that the one or more terms of the query represent an alias for a user-specific location that has not been designated for the identified user, providing a prompt to the user to specify a geographical location corresponding to the one or more query terms; receiving data indicating a geographical location input in response to the prompt; storing data indicating that, for the identified user, the alias corresponds to the geographical location input in response to the prompt; and providing, in response to the query, one or more search results responsive to the query wherein the alias corresponds to the geographical location input in response to the prompt.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, providing a prompt to the user to specify a geographical location corresponding to the one or more query terms comprises data for a user interface to receive user input indicating a geographical location corresponding to the one or more query terms, and receiving data indicating the geographical location input in response to the prompt comprises receiving data indicating a geographical location identified using the user interface. Providing the data for the user interface comprises providing data for a user interface that includes a text field for receiving an address, and receiving data indicating the geographical location identified using the user interface comprises receiving an address entered in the text field. Providing the data for the user interface comprises providing data for a map, and receiving data indicating the geographical location identified using the user interface comprises receiving data indicating user input that indicates a location on the map. Providing the data for the user interface comprises providing data indicating a set of search results, and receiving data indicating the geographical location identified using the user interface comprises receiving data indicating user interaction with a search result in the set of search results.

Implementations may include one or more of the following features. For example, the actions may further include determining one or more search results based on the one or more query terms representing the geographical location input in response to the prompt. Providing, in response to the query, the one or more search results responsive to the query wherein the alias corresponds to the geographical location input in response to the prompt comprises providing the determined one or more search results. The actions may further include modifying the query to include the geographical location input in response to the prompt, and obtaining search results responsive to the modified query. Providing, in response to the query, the one or more search results responsive to the query wherein the alias corresponds to the geographical location input in response to the prompt comprises providing one or more of the search results responsive to the modified query.

Implementations may include one or more of the following features. For example, providing, in response to the query, one or more search results responsive to the query wherein the alias corresponds to the geographical location input in response to the prompt comprises providing one or more search results that each includes a link to a corresponding web page. Providing, in response to the query, one or more search results responsive to the query wherein the alias corresponds to the geographical location input in response to the prompt comprises providing a map and indicia indicating one or more locations on the map. Providing, in response to the query, one or more search results responsive to the query wherein the alias corresponds to the geographical location input in response to the prompt comprises providing directions to or from the geographical location input in response to the prompt. The actions may further include receiving a second query from the user, determining, based on the stored data, that one or more terms of the second query are an alias for the geographical location input in response to the prompt, and in response to determining that the one or more terms of the second query are an alias for the geographical location input in response to the prompt, providing, in response to the second query, one or more search results responsive to the second query wherein the alias corresponds to the geographical location indicated in the stored data.

Advantageous implementations can include one or more of the following features. Users may refer to a location using an alias or nickname, without including an address in a query or other request. Users may set a location corresponding to an alias using a search engine interface. The use of an alias may be detected before a user designates a location corresponding to the alias. Aliases may be stored for individual users, allowing search results to be personalized for individual users.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
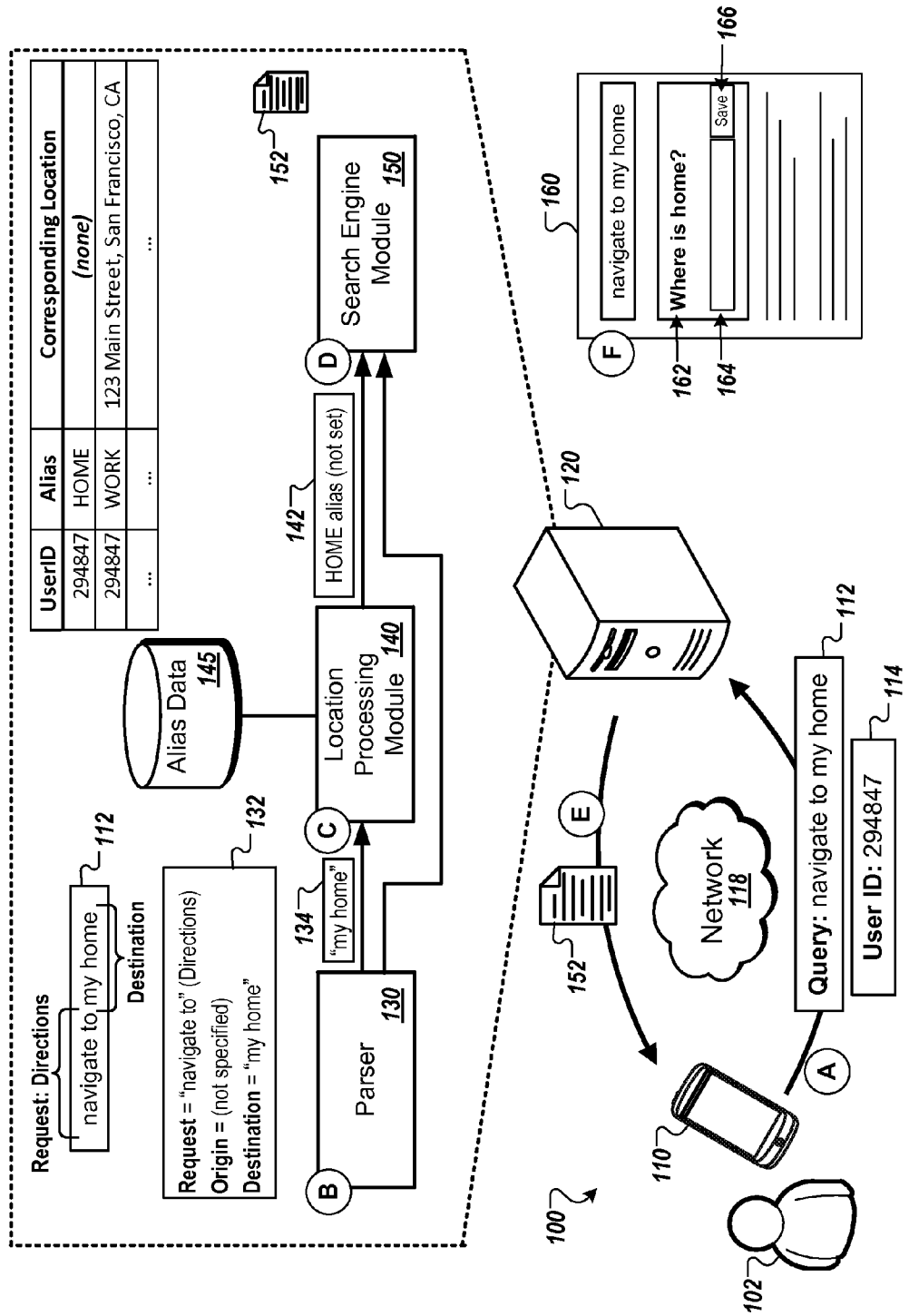
FIGS. 1A and 1B are diagrams that illustrate an example of a system for using location aliases.
Figure 1B:
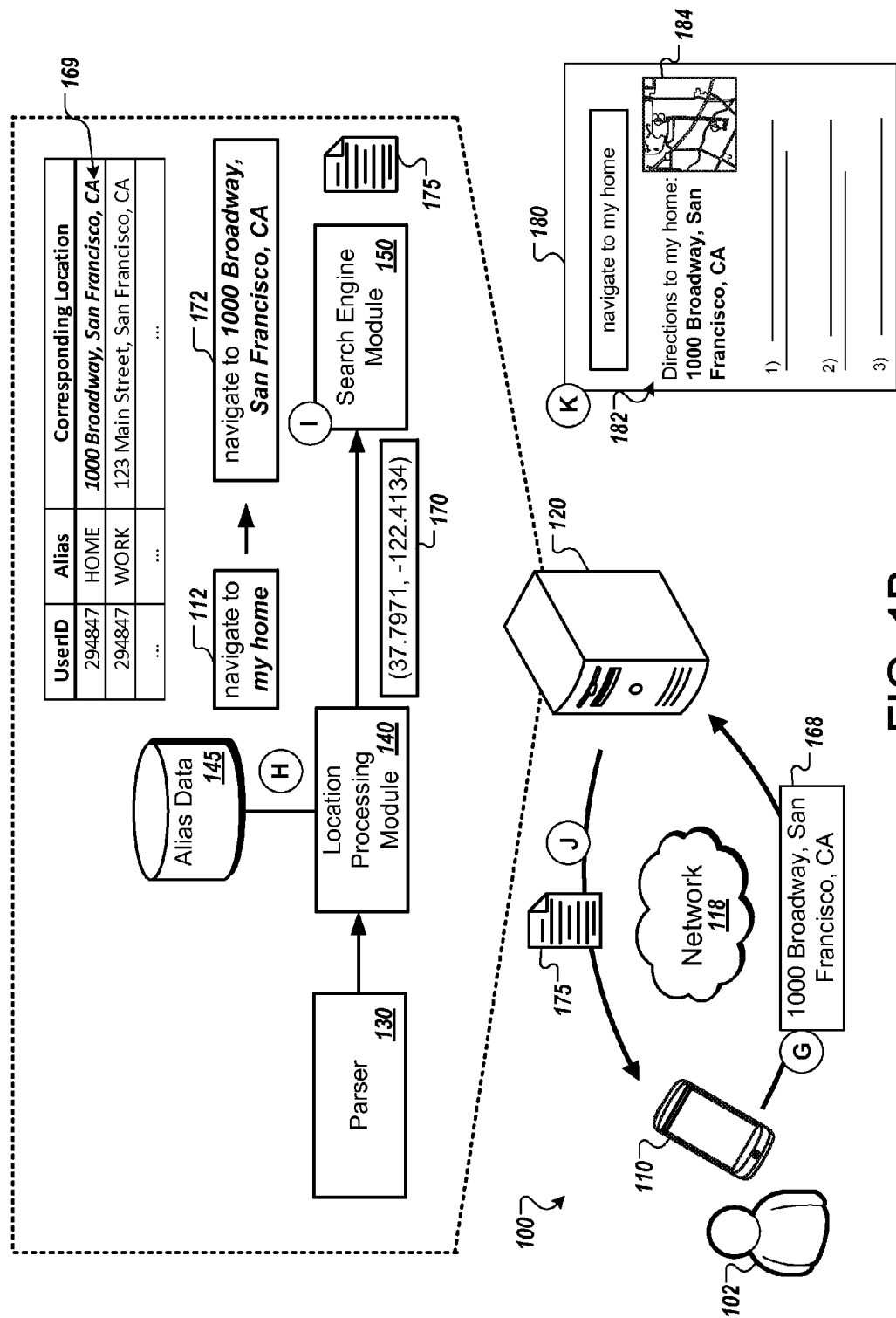

FIGS. 1A and 1B are diagrams that illustrate an example of a system 100 for using location aliases. The system 100 includes a client device 110, a computing system 120, and a network 118. In the example, the computing system 120 receives a query 112 or other input from the client device 110. The computing system 120 identifies a portion of the query 112 that is an alias for a location, interacts with the client device 110 to determine the location corresponding to the alias, and provides search results or other information in response to the query 112. FIGS. 1A and 1B show stages (A) to (K) which illustrate a flow of data, as well as user interfaces 160, 180 that may be displayed by the client device 110.

The client device 110 can be, for example, a desktop computer, a laptop computer, a cellular phone, a smart phone, a tablet computer, a music player, an e-book reader, a wearable computer, a navigation system, or other device. The functions performed by the computing system 120 can be performed by individual computer systems or can be distributed across multiple computer systems, e.g., one or more server systems. The network 118 can be wired or wireless or a combination of both, and may include private networks and/or public networks, such as the Internet.

In some implementations, a query is received from a user. The user that submitted the query is identified, and it is determined that one or more terms of the query represent an alias for a user-specific geographical location that has not been designated for the identified user. In response to the determination, a prompt is provided for the user to specify a geographical location corresponding to the one or more query terms that represent the alias. Data is received that indicates a geographical location input in response to the prompt. Data may be stored that indicates that, for the identified user, the alias corresponds to the geographical location input in response to the prompt. One or more search results responsive to the query may be provided, where the alias corresponds to the geographical location input in response to the prompt.

In the example of FIGS. 1A and 1B, during stage (A), a user 102 enters a query 112 or other input at the client device 110. For example, the user 102 may type the query 112. As another example, the user may speak, and the words of the query 112 may be determined through automatic speech recognition. The user 102 may input the query 112 to, for example, an application running on the client device 110, to an interface of a web page. The query 112 may represent a search for web pages or other documents, for map information, for directions, for images, or for other types of information.

The client device 110 transmits the query 112 to the computing system 120 over the network 118. The client device 110 may also transmit a user identifier, a device identifier, or other information that may indicate the user 102 that submitted the query 112. For example, the user 102 may be logged into a user account at the client device 110, and data indicating the user account may be provided to the computing system 120. As additional examples, a device identifier for the client device 110 or information from a cookie stored at the client device 110 may be provided.

During stage (B), a parser 130 of the computing system 120 parses the query 112. The parser 130 may identify portions of the query 112 that correspond to different semantic categories, e.g., portions that represent a location or portions that represent an action to perform. The parser 130 can be configured to recognize variants of aliases, for example, that "home," "my home," and "my house" each refer to the home of the user.

As discussed further below, the parser 130 may have access to data that indicates terms that represent location aliases. The parser 130 may access alias data 145, which may indicate aliases, query terms or other terms that represent the aliases or types of aliases, and the locations to which each alias corresponds. The terms may represent an alias for multiple users, e.g., "home," "my home," and "my house" may serve as an alias for all users. In addition, or as an alternative, terms that represent an alias may be personalized and stored for each user, e.g., a separate list of terms representing aliases may be identified and stored for each user, based on language that the user has used, or terms that the user has explicitly indicated as corresponding to an alias. Such terms may be determined implicitly from user inputs. For example, if a user submits a first query with an unrecognized alias, and afterward submits a second query that includes an address in place of the unrecognized alias, the alias may be identified and designated as representing the address from the second query in later searches by the user.

Any appropriate parsing technique may be used. In some implementations, the parser 130 may evaluate the query 112 with respect to one or more predetermined grammars or language patterns. For example, the parser 130 may compare the query 112 to multiple recognized patterns and identify a pattern that matches the query 112, or has at least a threshold level of similarity to the query 112. In addition, or as an alternative, the parser 130 may identify particular words or common expressions that indicate a request for geographical information, e.g., "where," "navigate," "directions," "map," etc. In addition, or as an alternative, the parser 130 may apply a set of rules to determine likely meanings of portions of the query 112. Some implementations may use classifiers, modules trained using machine learning, or other techniques to parse the query 112.

In the illustrated example, the query 112 is shown as "navigate to my home." The parser 130 determines that the phrase "navigate to" represents a request for navigation directions, and that navigation directions have an origin location and a destination location. Based on information about common usage patterns, which may indicate that the phrase "navigate to" is typically followed by a destination location, the parser 130 determines that the portion "my home" or "home" of the query 112 represents the destination location. The parser 130 determines that an origin location is not specified, and infers that the current location may be used as the origin location. As a result, the parser 130 may provide output 132 indicating (i) that the query terms "navigate to" represents a request, such as a request for directions, (ii) that the query terms "my home" represent a destination location, and (iii) that the query 112 does not include query terms indicating an origin location.

After the query 112 is parsed, a request 134 can be sent to a location processing module 140 to provide geocoding information, a street address, or other information for each of the locations that the parser 130 identified in the query 112. For example, the query terms "my home" that indicate the destination location can be provided to the location processing module 140 to request geographical coordinates and/or a street address for the destination location.

In stage (C), a location processing module 140 of the computing system 120 provides information about one or more locations referenced in the query 112. For example, the location processing module 140 provides output in response to each request for geographical information that is received. The location processing module 140 may evaluate received query terms to determine whether the query terms represent a street address, an alias for a location, or other type of information. For example, the location processing module 140 may compare received information with street address patterns and map data to determine whether the input represents an address. When a street address is provided as input, the location processing module 140 may identify and provide geographical coordinates, such as latitude and longitude or other coordinates, for the location indicated by the address.

To determine whether query terms are an alias for a location, the location processing module 140 may compare received information with words or phrases that are known to be used as aliases for user-specific locations. The set of terms considered to act as an alias for a location may be selected based on the usage of the terms in prior queries. For example, the location processing module 140 may access data indicating a previously determined set of words or phrases that are known to serve as an alias for a user's home, e.g., "home," "my home," "house," "my house," etc. Other data may indicate words or phrases that serve as an alias for a work location, e.g., "work," "my work," "office," etc.

The location processing module 140 may determine that a particular alias is used when the received data matches one or more of the set of terms associated with the particular alias. Other techniques for detecting the use of an alias may additionally or alternatively be used. For example, the location processing module 140 may compare received data to aliases that the particular user 102 that submitted the query 112 has previously used, or aliases that other users have used. As another example, the location processing module 140 may receive information about the query 112 and identify a word, phrase, or pattern in the query 112 that indicates that an alias is likely used. In some implementations, using these or other techniques, the location processing module 140 may determine that query terms are likely an alias for a location, and may determine a likely classification or type of location that the alias represents (e.g., home, work, etc.), before a user has designated any location corresponding to the alias, such as the first time that a user has attempted to use the alias.

If the location processing module 140 determines that the query term or terms received from the parser 130 are an alias for a location, further processing may be performed to determine the particular location that the query terms represent. To identify the particular location corresponding to an alias, the location processing module 140 may access alias data 145 that associates location aliases and corresponding locations for individual users. Generally, the meaning of an alias such as "home" is different for different users. Accordingly, each user can have a user-specific location designated for each alias, for example, so that each user has a user-specific "home" location, each user has a user-specific "work" location, and so on. Using a user identifier 114 or other information about the user, the location processing module 140 can access the records in the alias data 145 that indicate the locations for the specific user that submitted the query. If the alias data 145 includes a location corresponding to the identified alias for the identified user, then the location processing module 140 can output information about the location, e.g., geographical coordinates and/or a street address.

In some instances, the alias data 145 may not include a location corresponding to an alias for a given user. For example, a user may use an alias, such as "home" or "work," in a query without previously designating what location the alias refers to. In such instances, the location processing module 140 may determine that a location has not been set for the identified alias for the user, and may provide information that indicates that the alias is not set.

In the illustrated example, the location processing module 140 determines that the query terms "my home" are an alias, and that they refer to the home of the user 102. The location processing module 140 accesses a portion of the alias data 145 that indicates aliases and locations for the user 102, using the user identifier 114. The alias data 145 includes a location corresponding to a "work" alias for the user 102, but does not include a location corresponding to a "home" alias for the user 102. The location processing module 140 determines that the user 102 has not designated a "home" location. In response to the request for location information corresponding to the query terms "my home," the location processing module 140 provides output 142 indicating that the home alias is used, but that a particular location has not been set for the home alias.

In stage (D), a search engine module 150 generates data to provide in response to the query 112, using the output 132 of the parser 130 and output 142 of the location processing module 140. Based on the output 132 of the parser 130, the search engine module 150 determines that navigation directions should be provided. Because an origin location is not specified in the query 112, the search engine module 150 infers that the origin location is the current location of the client device 110. In some implementations, a location of the client device 110 has been provided previously, for example, with the query 112 or in a recent interaction with the client device 110, and can be used as the current location. As an alternative, the search engine module 150 may cause a request for a current location to be sent over the network 118 to the client device 110, and a current location may be received in response.

Based on the output 142 of the location processing module 140, the search engine module 150 determines that an alias for the user's home is included in the query 112, and that the location corresponding to the home alias is unknown. Since a destination location is not available, the search engine module 150 generates data causing a prompt to be provided to the user 102 to enter a location corresponding to the home alias. For example, the search engine module 150 may generate a resource 152, such as a web page, that includes a user interface for inputting the address of the user's home. Additionally or alternatively, other data may be provided that causes a prompt to be provided at the client device 110 without transferring a web page. For example, the computing system 120 may provide data to be added to or overlaid with display of a web page. Data from the computing system 120 may cause an application at the client device 110 to provide a pop-up, an overlay, or other user interface element, or to update a display area, so that a user may indicate a location corresponding to the alias.

The search engine module 150 may also obtain an initial set of search results that are responsive to the query 112. Although the interpretation of the query 112 is not complete, due to the lack of the destination address, the initial set of search results may be included in the resource 152 and be provided with the prompt.

In some implementations, the parser 130, the location processing module 140, and the search engine module 150 may each have access to the same alias data 145. In addition, or as an alternative, one or more modules that have access to the alias data 145 may identify and provide alias and location information for users to other modules, such as modules that do not have access to the alias data 145.

During stage (E), the computing system 120 provides data to the client device 110 in response to the query 112. For example, the computing system 120 can provide the resource 152, or may provide other data causing display of a prompt at the client device 110 prompting the user 102 to indicate a location corresponding to the home alias.

During stage (F), the client device 110 displays a user interface 160 that prompts the user 102 to enter a location corresponding to the home alias. For example, the user interface 160 may be a view of the resource 152, as shown in a web browser or other application. In the illustrated example, the user interface 160 includes a message 162, for example, "where is home?," and also includes a text field 164 for the user to enter a street address. Once the user 102 has entered his home address, the user 102 interacts with a control 166 in the user interface 160 that causes the home address to be transmitted to the computing system 120. In some implementations, a list of suggested addresses, such as auto-completion suggestions or other suggestions, may be provided on the user interface 160 as the user types, speaks, or otherwise provides input.

In some implementations, the user interface 160 may permit the user 102 to specify a location in ways other than typing a street address into a text field. For example, the user interface 160 may include a map and indicia marking locations on the map. The user may interact with the map or accompanying information to select one of the marked locations. The marked locations may be, for example, locations for which the user has previously submitted an address in a query or other user input. As additional examples, suggested locations may be locations that the user 102 has previous visited or has visited most frequently, as detected by the client device 110. In some implementations, the user interface 160 may provide a set of search results that each have an associated location, and the user 102 may interact with one of search results to select the associated location as the location corresponding to the alias.

Referring now to FIG. 1B, during stage (G), the client device 110 provides location data 168 indicating the location that the user 102 specified in response to the prompt in the user interface 160. In the illustrated example, the user 102 entered the address "1000 Broadway, San Francisco, Calif." as the user's home location. The client device 110 provides this input to the computing system 120 over the network 118.

During stage (H), the location data 168 is provided to the location processing module 140. The location processing module 140 stores data that associates the location indicated by the location data 168 with the home alias for the particular user 102. For example, the location processing module 140 stores data 169 in the alias data 145 that indicates that the received street address, e.g., "1000 Broadway, San Francisco, Calif.," is the home location for the user 102. For the most recent query 112 of the user 112, and for future queries by the user 102, this location may be used as the home location for the user 102. To link the location to the user 102, the stored data 169 can associate the location that the user 102 indicated in response to the prompt with, for example, a user account for the user 102, a user identifier for the user 102, a device identifier for the client device 110, a cookie stored on the client device 110, or other data that identifies the user 102 or the client device 110.

In some implementations, the location processing module 140 may also provide geographical coordinates 170 or other location data corresponding to the location that the user 102 identified in response to the prompt. For example, the location processing module 140 may provide latitude and longitude coordinates, or coordinates in another format, that may be used to locate the location on a map or generate directions to or from the location. As an alternative, another module may determine geographical coordinates. The location processing module 140 may provide an address, a reference to a location where geographical information is stored, or other information instead of a geographical coordinates.

During stage (I), the search engine module 150 generates a response to the query 112 based at least in part on the location corresponding to the alias in the query 112, e.g., the location that the user 102 indicated in response to the prompt in the user interface 160. Since the user 102 has indicated the location corresponding to the alias, the search engine module 150 interprets the alias to be a reference to that location when obtaining search results and other data. The search results or other information generated by the search engine module 150 may be included in a resource 175, e.g., a web page, that may be transmitted to the client device 110.

In some implementations, the search engine module 150 modifies the user's original query 112 to include the location that corresponds to the alias in the query 112. For example, a modified query 172 can be generated that replaces the query terms used as an alias with information that identifies the location corresponding to the alias. In the illustrated example, a modified query 172 is generated that substitutes the street address for the user's home, e.g., "1000 Broadway, San Francisco, Calif.," for the query terms "my home" that were used as an alias in the query 112. The search engine module 150 may then obtain search results responsive to the modified query 172 and provide those search results in response to the user's original query 112. The search results may include any appropriate type of information, including, for example, information that is from or that identifies web pages and other documents, videos, images, maps, navigation directions, books, and other types of content.

In some implementations, the search engine module 150 uses geographical coordinates 170 provided by the location processing module 140 to generate a map and/or navigation directions. For example, the search engine module 150 may determine that the query 112 or the modified query 172 is a request for navigation directions. As a result, the search engine module 150 can cause directions to be generated for navigating from the current location of the client device 110 to the geographical coordinates 170 provided by the location processing module 140. Navigation and mapping information may be provided by a mapping system or navigation module. The search engine module 150 may communicate with other modules or systems to request and receive navigation or map information for a response to the query 112. One or more maps may also be generated, for example, showing at least some of the route indicated in the directions.

During stage (J), the computing system 120 transmits the resource 175 including search results to the client device 110. As discussed above, the resource 175 may include search results, which may include navigation directions, maps, and other geographical information, that are determined based at least in part on equating the query terms that serve as an alias with the location that the user 102 designated as corresponding to the alias.

During stage (K), the client device 110 displays a user interface 180 that includes one or more search results where the alias corresponds to the location the user indicated. Any of various types of search results may be included, for example, maps, navigation directions, nearby places, web pages or other documents, images, videos, audio, and other information, where the search results can be relevant to the location that the user indicated as corresponding to the alias. For example, in a search for web pages or other documents, documents that mention the location the user specified or nearby locations may be provided. As another example, search results may include a map showing businesses or other locations located near the location referred to with an alias. As another example, navigation directions to or from the location referred to with an alias may be shown. Similarly, images of the location, videos of the location, or other media associated with the location referred to with an alias may be provided.

In the illustrated example, the user interface 180 includes navigation directions 182 from the current location of the user 102 to the user's home, which the user indicated to be "1000 Broadway, San Francisco, Calif." The user interface 180 also includes a map showing the destination and the route indicated by the directions 182.

In the example of FIGS. 1A and 1B, the parser 130, the location processing module 140, and the search engine module 150 are shown as separate modules for clarity, but functions may be combined in a single module or distributed across additional modules. As an example, the location processing module 140 may be divided into an alias processing module and a geocoding module. The alias processing module may detect the use of aliases in and my rewrite an alias by substituting an address for the location. When a location corresponding to an alias is known, the alias processing module may submit a request to the geocoding module that indicates the address for the location rather than the query terms for the alias. In some implementations, the various functions performed by the computing system 120 may be distributed across multiple servers or other devices.

When an alias is used in a query and the alias data 145 indicates a location corresponding to the alias for the particular user that submitted the query, search results may be generated and provided without prompting the user to specify a location. For example, in response to receiving the query terms that serve as an alias, the location processing module 140 may provide the street address and/or geographical coordinates for the location indicated by the alias data 145. The information may then be used to generate a response to the query where the query terms that serve as an alias are interpreted as a reference to the corresponding location.

In some implementations, a user may use two or more location aliases in a single query, and the computing system 120 may identify each portion of the query that serves as an alias and may determine a user-specific location corresponding to each alias. The computing system 120 may provide a prompt for each alias that has not been set. For example, if a user enters a query "directions from home to work," and neither a home location nor a work location has been designated by the user, a prompt may be provided to enter a location for each alias. In some implementations, prompts may be provided one-by-one on different interfaces, so that the user specifies the location for one alias at a time. In some implementations, prompts or controls to specify locations corresponding to different aliases may be included together in a single interface.

In some implementations, multiple different query terms or combinations of query terms may be mapped to a single alias type. For example, the query terms "home," "house," "my home," and "my house" may all be mapped to the alias type of a "home" location of a user, so that these query terms refer to the same location. In some implementations, the mappings of terms and phrases to an alias type, e.g., home or work, may be predetermined, for example, based on analysis of user input from multiple users. In some implementations, a mapping of terms and phrases to an alias type location type may be stored and modified for individual users. When query terms that map to an alias that has a corresponding location set for a user, the location processing module 140 may provide geographical coordinates and/or a street address for the location. When query terms map to an alias is not set for the user, the location processing module 140 provides a partial alias location interpretation, for example, an indication of which alias the query terms correspond to, and an indication that the location has not been set.

In some implementations, various types or classes of user-specific locations may be designated. For example, a "home" location and a "work" location may be designated for individual users. Aliases may be identified and recognized for other locations, such as a user's preferred theater, library, gym, grocery store, and so on. In some implementations, a user may signal intention to use an alias using a predetermined alias operator, which could be a character such as "@" or "#" at the beginning or end of the phrase. In some instances, use of an alias may be detected based on other language patterns or user data. Use of an alias may be detected based on use of a particular language pattern, such as use of a possessive adjective or other keyword, e.g., "my grocery store," "my gym," or "my theater." The computing system 120 may use alias data 145 to disambiguate the meaning of such an alias, or may cause a prompt to be provided if the alias data 145 does not indicate a corresponding location. As an example, if the user's query is "navigate to my gym," the computing system 120 may detect the request for geographical information based on the word "navigate." The computing system 120 may also determine that a location is specified, e.g., "gym," and that it is personalized to the user, e.g., based on the word "my," and thus determine that "my gym" is an alias. If no "gym" location has been set for the user, the computing system 120 may prompt the user, "where is your gym?" and provide an interface for entering a street address for the user's gym. Alternatively, the computing system 120 may provide data indicating a list of gyms or a map of gyms, e.g., located near the user's home or current location, and ask the user to select which of the gyms indicated is the user's gym. Based on input from the user, the computing system 120 may provide results using an interpretation of "my gym" as the location indicated by the user.

In some implementations, capabilities for detecting the use of an alias and identifying the corresponding location may be implemented for multiple languages. Cross-language support may also be provided. For example, when a user has designated a location as a home location, the same home location may be used whenever the user is logged into his user account, even when language settings or the language of queries entered changes. As another example, words in multiple languages may map to the same locations. For example, "home" (English), "casa" (Spanish), and "maison" (French) may each be mapped to the same home location of the user.

Figure 2A:
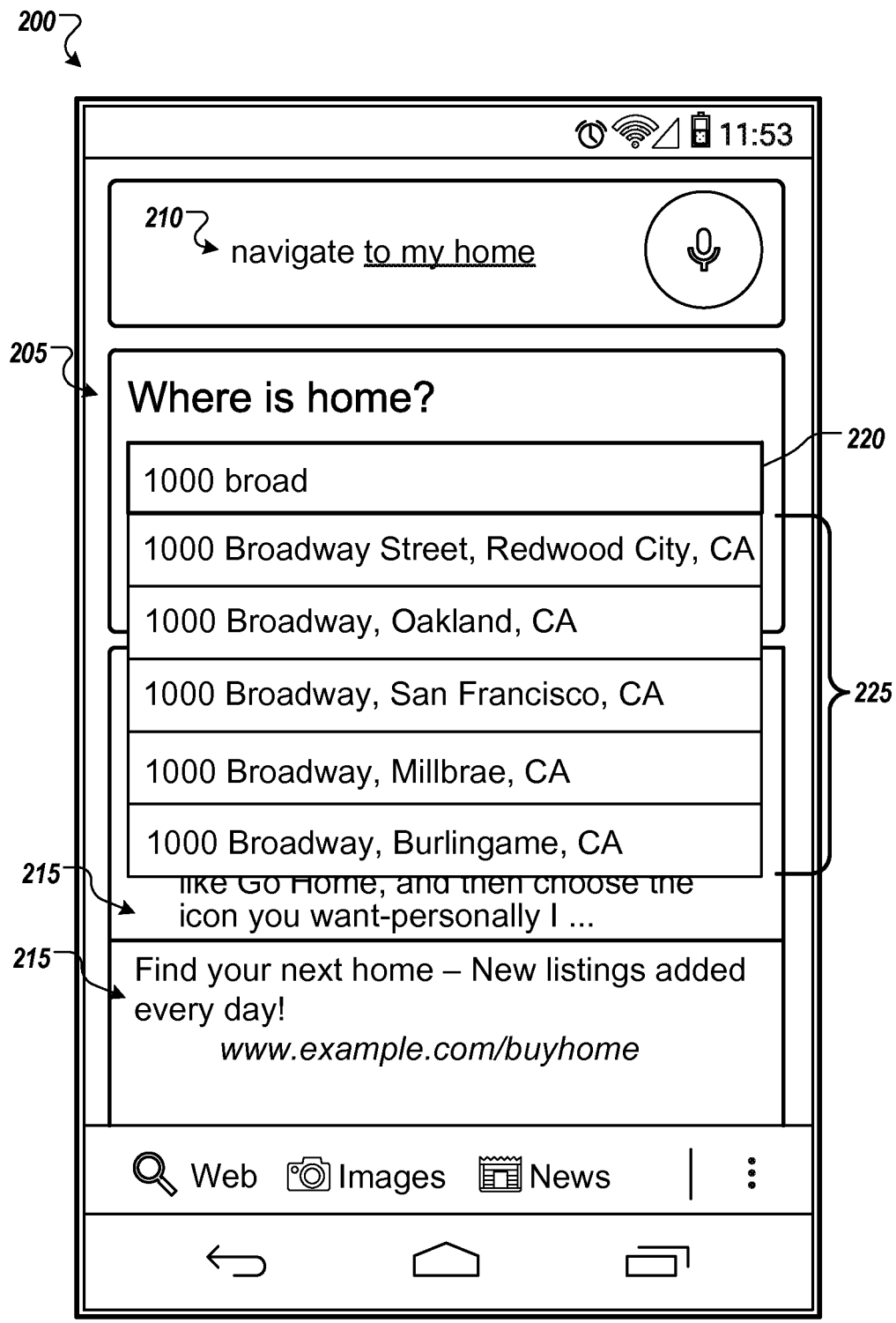
FIGS. 2A, 2B, and 2C are user interfaces that illustrate examples of user interfaces for using location aliases.
Figure 2B:
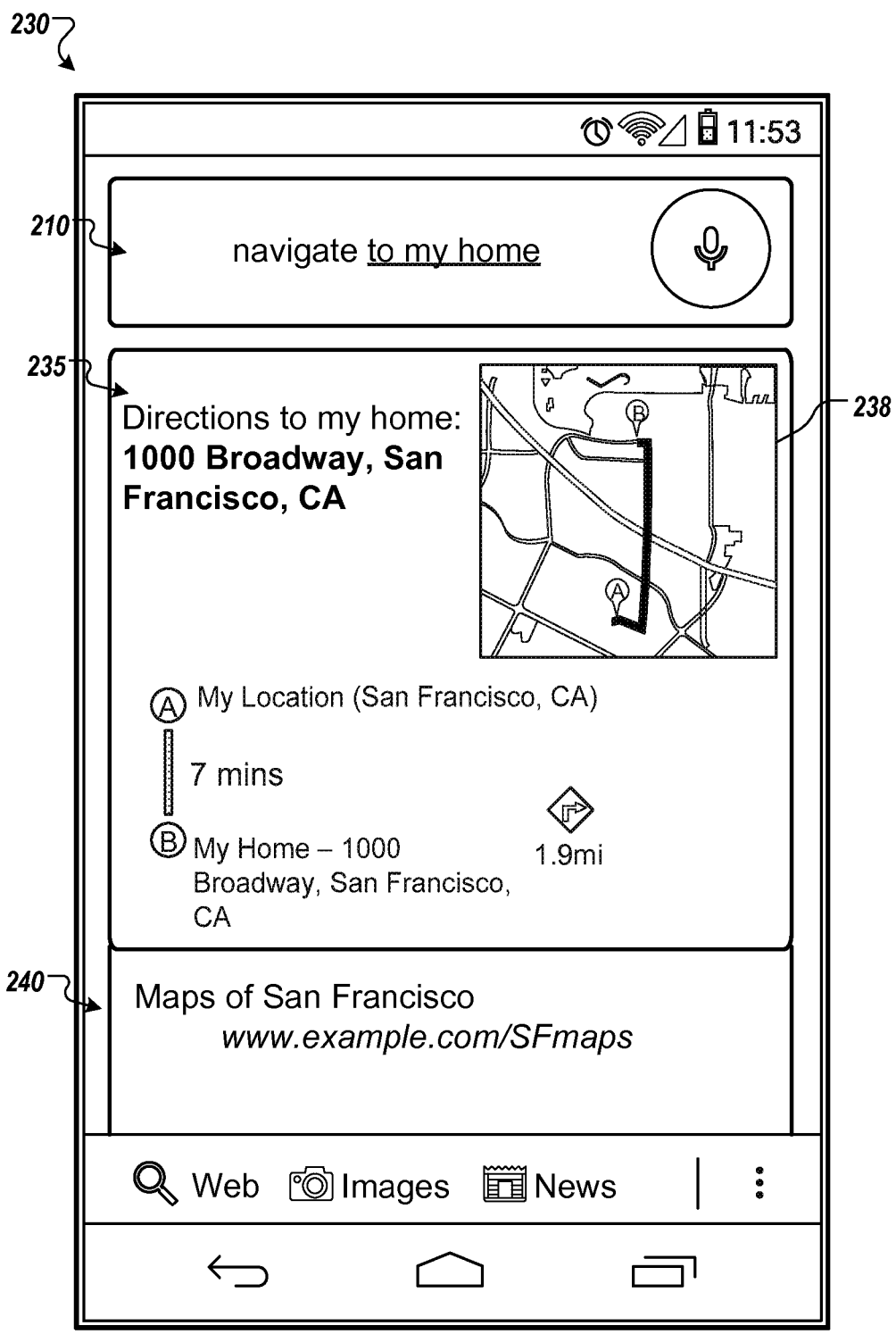
Figure 2C:
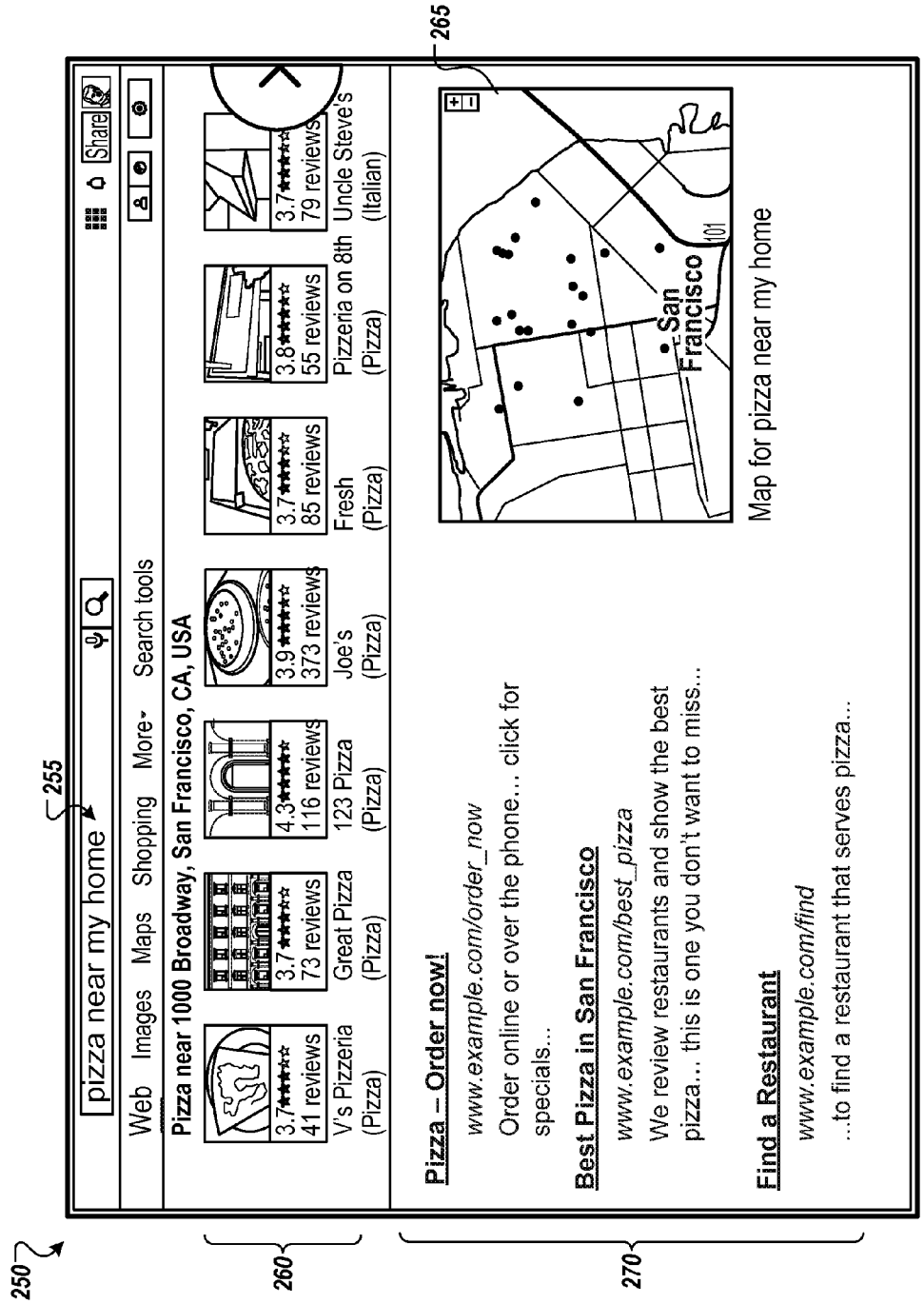

FIGS. 2A, 2B, and 2C are user interfaces that illustrate examples of user interfaces for using location aliases. FIG. 2A shows a user interface 200 that includes a prompt 205 for a user to indicate a location corresponding to an alias. The user has entered the query 210 "navigate to my home," and in response, the user interface 200 is provided to allow the user to designate a street address for the user's home. The user interface 200 may include one or more search results 215 as well as the prompt 205, allowing the user to receive an initial set of results responsive to the query 210 even before the meaning of the alias has been determined. The user interface 200 may be a web page, e.g., for a search engine, a mapping service map, or navigation direction service, or may be an interface of a search application, mapping application, navigation application, and so on. As shown, the user interface 200 permits the user to indicate the location corresponding to the alias without leaving a search or mapping interface. For example, the user interface 200 allows the user to indicate a home location to be used in generating results to the query 210 without leaving the search interface and without the user having previously visited another interface to set the home location.

Prompts may be provided in any of a variety of different forms. For example, interaction may occur through a spoken conversation. In response to a voice query that uses an alias for a location, an audible prompt may be provided. For example, in response to a query such as "directions to home," a server system may provide data that causes an audible question such as "where is home?" may be played at a user's device. To input the location, the user may speak an address or other identifying information, and the input may be processed using automatic speech recognition. The requested information may then be provided to the client device, for presentation in an audible, visual, or other format.

In response to the prompt 205, the user enters an address in a text field 220. As the user enters the address, one or more suggested addresses 125 may be provided. The user may select one of the suggested addresses 125, e.g., with a tap, click, or other interaction, to complete the address in the text field 220. In some implementations, the user makes another interaction, e.g., with a button or other control, to save the address as the location corresponding to the alias.

FIG. 2B shows an example of a user interface 230 that includes search results determined using the location provided by the user as the user's home address. The user interface 230 may be an interface of an application or web page that is displayed in response to the user submitting a location using the user interface 200 of FIG. 2A. The search results on the user interface include navigation directions 235 from the user's current location to the user's home location and a map 238. The search results also include data 240 indicating documents, such as web pages, that are responsive to the user's search query 210. The search results may be results from a modified query in which "my home" is replaced by the address that the user provided. Search results may be customized for the user based on the interpretation of "home" as the user-specified location for any appropriate type of information, such as images, videos, locations, or other items, or search results that identify web pages or other documents, e.g., with a snippet of text from the document and a link to the document, or search results that indicate books.

In some implementations, the type of search results that are provided, or the order or arrangement of the search results, may be determined based at least in part on the use of an alias. For example, a search engine system may assign weights or other scores to different categories of search results, such as document results, navigation results, map results, image results, and so on. When a location alias or used in a query, mapping and navigation results may be weighted higher than other categories of results. For example, navigation or mapping results may be assigned a weight that indicates a higher relevance to the query than results that identify web pages. As a result, mapping and navigation results can be more likely to be provided for display in response to a query that uses a location alias than for queries that do not use location aliases. The weighting values assigned to different categories of search results may be used to select which type or types of search results will be provided and which will be excluded from a response to a query. Similarly, a search engine system may use the weighting values to determine which type of search result to display at the top of a results page on in an initially viewable display area.

FIG. 2C shows an example of a user interface 250 showing results to a query 255 that requests information about locations near a location specified with an alias. In the illustrated example, the user previously designated a location as a home location, for example, in a prior search session or other interaction, possibly hours, days, or longer before the current search. The query 255 refers to the user's home, and a search engine system uses the stored home location to generate results for the query 255. In response to the query 255 "pizza near my home," a variety of search results are provided that based on the stored address being interpreted as the user's home. The search results include data 260 indicating businesses, e.g. pizza restaurants, near the stored home address, and a map 265 showing the locations of the businesses. The search results also include data 270 indicating documents that are responsive to the query 255 with the alias being interpreted as the stored address for the alias. The documents indicated may be selected to be relevant to a modified query that includes at least portions of the stored address for the user's home. For example, although the query 255 does not explicitly mention the city of San Francisco, because the query terms "my home" are known to refer to a location in San Francisco, some or all of the documents identified in the search results may be selected to be relevant to a user in San Francisco and/or to include references to San Francisco.

Because a server system, such as the computing system 120 of FIGS. 1A and 1B, can store locations corresponding to aliases, the locations may be used to provide information to different devices associated with the user. For example, a user that is logged into a user account with a phone may designate a location for an alias using the phone. If the user later uses a second device to submit a query that includes the alias, the designated location for the alias can be used to generate results to the query if the user is logged in to the same user account with the second device. In some implementations, user devices may store data indicating locations corresponding to aliases, in addition to or instead of a server storing the data.

Stored data indicating a location corresponding to an alias may be used across different web sites, applications, or types of searches. For example, a location that a user associates with an alias during a search of web documents may later be used to generate results during a search for navigation directions. Similarly, a location that a user associates with an alias using a mapping application may be used to generate results to queries submitted using a the mapping application, another application, a voice query interface, a search engine web page, or other query interface.

In some implementations, alias data may be used by program that provides calendar or reminder information. For example, a user may use a device to set a reminder, "remind me to meet with John when I arrive at work." When the user sets the reminder, the device may access local data or interact with a server system to determine whether an alias is used and what that alias represents. For example, the user's device or a server system may determine that the term "work" is an alias for the user's work location. If a work location is not known for the user, a prompt may be provided for the user to enter the work location. The reminder may then be triggered when the user arrives at the work location previously set as corresponding to the alias.

Figure 3:
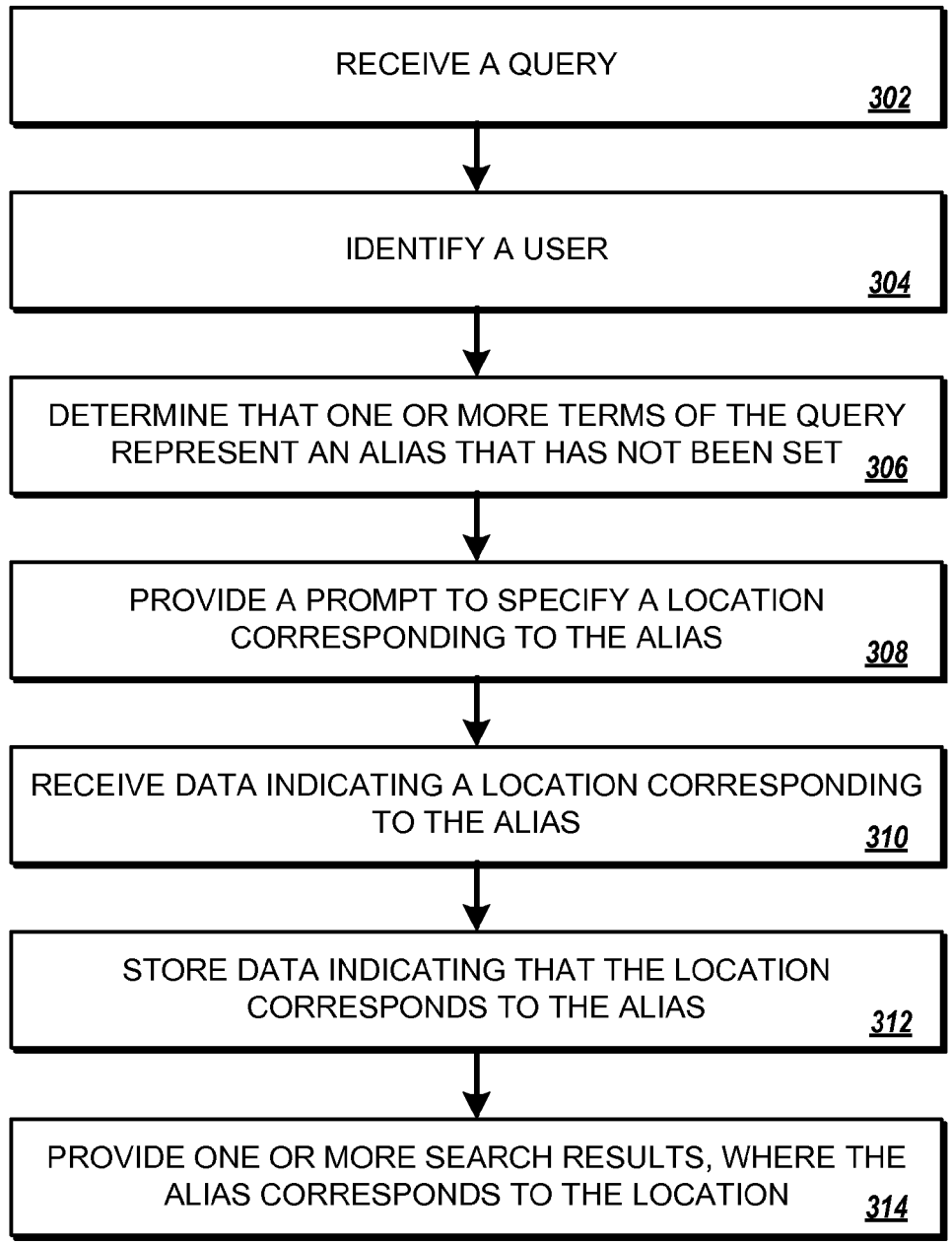
FIG. 3 is a flow diagram illustrating an example of a process for using location aliases.

FIG. 3 is a flow diagram that illustrates an example of a process 300 for using location aliases. The process 300 is described as being performed by a computing system, e.g., the computing system 120 of FIGS. 1A and 1B, but the process 300 may be performed by or another system or device.

The computing system receives a query from a user (302). The computing system identifies the user that submitted the query (304). For example, the user may be logged in to a user account, and the user account may be identified. A user may be identified based on a device identifier, a phone number, data in a cookie stored on the device that submitted the query, or other data. In some implementations, if the user is not logged in to a user account, a prompt is provided to the user to request that the user log in to an account. The user may be identified based on the log-in information that the user provides in response to the prompt.

The computing system determines that one or more terms of the query represent an alias for a user-specific geographical location that has not been designated for the identified user (306). For example, the query may be parsed, and portions of the query that likely correspond to locations may be identified. Query terms that likely correspond to locations may be compared with sets of words that are mapped to specific aliases, such as a home location alias, a work location alias, and so on. When one or more query terms are determined to correspond to an alias, a data set indicating aliases and corresponding locations may be checked to determine if a location is associated with the alias for the identified user. If the stored data does not indicate a location for the alias for the identified user, then it may be determined that the user has not designated a location.

The computing system provides a prompt to the user to specify a geographical location corresponding to the one or more query terms (308). For example, the computing system may generate and provide a resource, such as a web page, that requests that the user indicate a location corresponding to the alias. As another example, the computing system may provide data that causes an application on a client device to display a prompt to input a location.

In some implementations, providing a prompt includes providing data for a user interface to receive user input indicating a geographical location corresponding to the one or more query terms that serve as an alias. For example, the user interface may include a text field for receiving an address, and the user may indicate the geographical location corresponding to the one or more query terms by entering an address in the text field. As another example, the user interface may include a map, and the user may indicate the geographical location corresponding to the one or more query terms by entering user input that indicates a location on the map. Additionally or alternatively, the user interface may include a set of search results, and the user may indicate the geographical location corresponding to the one or more query terms by interacting with a search result in the set of search results.

In some implementations, such as in response to a voice query, the computing system may cause an audible prompt to be provided by a client device. In some implementations, an initial set of search results for the query may be provided with the prompt, based on a partial understanding of the query.

The computing system receives data indicating a geographical location input in response to the prompt (310). For example, data indicating a street address that a user entered may be received. Data indicating other user input, such as indicating a location on a map, selection of a search result, a spoken address, or other input may additionally or alternatively be received to indicate the geographical location.

The computing system stores data indicating that, for the identified user, the alias corresponds to the geographical location input in response to the prompt (312). The stored data may be associated the alias with the geographical location, for the particular user that was identified. The data may be stored so that the geographical location may be used as the interpretation for the alias in response to future queries from the identified user.

In response to the query, the computing system provides one or more search results responsive to the query, where the alias corresponds to the geographical location input in response to the prompt (314). The one or more search results may be provided as, for example, a resource such as a web page or data used by an application on a client device of the user. For example, navigation directions to or from the geographical location may be provided. As another example, information indicating businesses or other locations near, e.g., within a threshold distance of, the geographical location may be provided. A map showing the geographical location may be provided. Search results that indicate web pages or other documents may be provided.

The one or more search results may be determined at least in part based on the one or more query terms of the alias representing the geographical location input in response to the prompt. For example, search results can be personalized for the particular user that submits the search by generating the results to be relevant for the specific location that the alias represents for particular user. For example, in response to a search query that includes the term "work," search results can be selected based on relevance to the location of the particular user's work, e.g., a country, state, county, city, neighborhood, or particular address that the user designates as a work location, rather than simply matching the word "work."

In some implementations, the one or more search results are obtained using a modified query. For example, the user's query may be modified to include the geographical location input in response to the prompt. For example, an address that the user enters may be added to the query or may replace the one or more query terms that serve as an alias. Search results responsive to the modified query may be obtained any may be provided as responsive to the user's query.

In some implementations, a second query is received from the user. Based on the stored data, it may be determined that one or more terms of the second query are an alias for the geographical location input in response to the prompt. In response, one or more search results responsive to the second query may be provided, where the alias corresponds to the geographical location indicated in the stored data.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers of a server system, the method comprising:
   receiving, by the one or more computers of the server system, a query from a client device of a user;
   identifying, by the one or more computers of the server system, the user that submitted the query;
   determining, by the one or more computers of the server system, that one or more terms of the query represent an alias for a user-specific geographical location that has not been designated for the identified user;
   in response to determining that the one or more terms of the query represent an alias for a user-specific location that has not been designated for the identified user, providing, by the one or more computers of the server system, data causing the client device to output a prompt to the user to specify a geographical location corresponding to the one or more query terms;
   receiving, by the one or more computers of the server system, data indicating a geographical location input in response to the prompt;
   storing, by the one or more computers of the server system, data indicating that, for the identified user, the alias corresponds to the geographical location input in response to the prompt, wherein the server system stores, for each individual user of a set of multiple users, data designating a specific geographical location that the individual user has specified as corresponding to the alias, and wherein the stored data designates different geographical locations for the same alias for different users in the set of multiple users; and
   providing, by the one or more computers of the server system and in response to the query, one or more search results responsive to the query wherein the alias corresponds to the geographical location input in response to the prompt.

2. The method of claim 1, wherein providing data causing the client device to output a prompt to the user to specify a geographical location corresponding to the one or more query terms comprises providing data for a user interface to receive user input indicating a geographical location corresponding to the one or more query terms; and
   wherein receiving data indicating the geographical location input in response to the prompt comprises receiving data indicating a geographical location identified using the user interface.

3. The method of claim 2, wherein providing the data for the user interface comprises providing data for a user interface that includes a text field for receiving an address; and
   wherein receiving data indicating the geographical location identified using the user interface comprises receiving an address entered in the text field.

4. The method of claim 2, wherein providing the data for the user interface comprises providing data for a map; and
   wherein receiving data indicating the geographical location identified using the user interface comprises receiving data indicating user interaction with a location on the map.

5. The method of claim 2, wherein providing the data for the user interface comprises providing data indicating a set of search results; and
   wherein receiving data indicating the geographical location identified using the user interface comprises receiving data indicating user interaction with a search result in the set of search results.

6. The method of claim 1, further comprising determining one or more search results based on the one or more query terms representing the geographical location input in response to the prompt;
   wherein providing, in response to the query, the one or more search results responsive to the query wherein the alias corresponds to the geographical location input in response to the prompt comprises providing the determined one or more search results.

7. The method of claim 1, further comprising:
   modifying the query to include the geographical location input in response to the prompt; and
   obtaining search results responsive to the modified query;
   wherein providing, in response to the query, the one or more search results responsive to the query wherein the alias corresponds to the geographical location input in response to the prompt comprises providing one or more of the search results responsive to the modified query.

8. The method of claim 1, wherein providing, in response to the query, one or more search results responsive to the query wherein the alias corresponds to the geographical location input in response to the prompt comprises:
   providing one or more search results that each includes a link to a corresponding web page.

9. The method of claim 1, wherein providing, in response to the query, one or more search results responsive to the query wherein the alias corresponds to the geographical location input in response to the prompt comprises:
   providing a map and indicia indicating one or more locations on the map.

10. The method of claim 1, wherein providing, in response to the query, one or more search results responsive to the query wherein the alias corresponds to the geographical location input in response to the prompt comprises:
    providing directions to or from the geographical location input in response to the prompt.

11. The method of claim 1, further comprising:
    receiving a second query from the user;
    determining, based on the stored data, that one or more terms of the second query are an alias for the geographical location input in response to the prompt; and
    in response to determining that the one or more terms of the second query are an alias for the geographical location input in response to the prompt, and without causing a prompt to the user to specify a geographical location corresponding to the one or more terms of the second query that are an alias for the geographical location, providing, in response to the second query, one or more search results responsive to the second query wherein the alias corresponds to the geographical location indicated in the stored data.

12. The method of claim 1, wherein determining that one or more terms of the query represent an alias for a user-specific geographical location that has not been designated for the identified user comprises:
    determining that the one or more terms of the query match one or more terms of a particular location alias that is used by multiple users but represents a different user-specific geographical location that is personalized for each of the multiple users; and
    determining that a set of records does not indicate a personalized, user-specific geographical location corresponding to the particular location alias for the identified user.

13. The method of claim 1, wherein receiving a query from a user comprises receiving a query that includes a first set of one or more terms and a second set of one or more terms that are different from the first set of one or more terms;
    wherein determining that one or more terms of the query represent an alias for a user-specific geographical location that has not been designated for the identified user comprises determining that the first set of one or more terms of the query represents the alias for the user-specific geographical location;
    wherein the method further comprises selecting, based on the second set of one or more terms of the query, a particular type of search results to provide in response to the query from among multiple different types of search results; and
    wherein providing the one or more search results responsive to the query comprises providing one or more search results that are of the particular type and that were obtained using the data indicating the geographical location input in response to the prompt.

14. The method of claim 1, further comprising:
    after storing, by the one or more computers of the server system, the data indicating that, for the identified user, the alias corresponds to the geographical location input in response to the prompt:
    receiving, by the one or more computers of the server system, a second query associated with the identified user, wherein the second query includes the one or more terms that represent the alias;
    determining, by the one or more computers of the server system, the geographical location that the stored data designates as corresponding to the alias for the identified user, wherein the stored data is associated with a user account for the identified user and is maintained by the server system over multiple search sessions of the identified user; and
    providing, by the one or more computers of the server system and in response to the second query, one or more search results for a modified second query in which the second query has been modified to replace the one or more terms with the determined geographical location.

15. The method of claim 1, further comprising:
    identifying, in user-submitted text of the query, a predetermined symbol or keyword denoting that an alias for a specific geographical location is included in the query; and
    determining that the one or more terms of the query represent the alias based on the predetermined symbol or keyword.

16. The method of claim 15, wherein determining that the one or more terms of the query represent the alias based on the predetermined symbol or keyword comprises:
    determining that the predetermined symbol or keyword occurs immediately before the one or more terms in the query; and
    determining that the one or more terms of the query represent the alias based on determining that the predetermined symbol or keyword occurs immediately before the one or more terms in the query.

17. The method of claim 1, further comprising:
    storing mapping data that (i) maps the one or more terms to an alias type, and (ii) maps one or more other terms to the alias type, wherein the one or more other terms are not included in the query; and
    based on the mapping data, determining that the one or more other terms refer to the geographical location input in response to the prompt.

18. A system comprising:
one or more computers of a server system and one or more storage devices storing instructions that are operable, when executed by the one or more computers, to cause the one or more computers to perform operations comprising:
- receiving, by the one or more computers of the server system, a query from a client device of a user;
- identifying, by the one or more computers of the server system, the user that submitted the query;
- determining, by the one or more computers of the server system, that one or more terms of the query represent an alias for a user-specific geographical location that has not been designated for the identified user;
- in response to determining that the one or more terms of the query represent an alias for a user-specific location that has not been designated for the identified user, providing, by the one or more computers of the server system, data causing the client device to output a prompt to the user to specify a geographical location corresponding to the one or more query terms;
- receiving, by the one or more computers of the server system, data indicating a geographical location input in response to the prompt;
- storing, by the one or more computers of the server system, data indicating that, for the identified user, the alias corresponds to the geographical location input in response to the prompt, wherein the server system stores, for each individual user of a set of multiple users, data designating a specific geographical location that the individual user has specified as corresponding to the alias, and wherein the stored data designates different geographical locations for the same alias for different users in the set of multiple users; and
- providing, by the one or more computers of the server system and in response to the query, one or more search results responsive to the query wherein the alias corresponds to the geographical location input in response to the prompt.

19. The system of claim 18, wherein the operations further comprise determining one or more search results based on the one or more query terms representing the geographical location input in response to the prompt;
wherein providing, in response to the query, the one or more search results responsive to the query wherein the alias corresponds to the geographical location input in response to the prompt comprises providing the determined one or more search results.

20. The system of claim 18, wherein the operations further comprise:
- modifying the query to include the geographical location input in response to the prompt; and
- obtaining search results responsive to the modified query;
wherein providing, in response to the query, the one or more search results responsive to the query wherein the alias corresponds to the geographical location input in response to the prompt comprises providing one or more of the search results responsive to the modified query.

21. A non-transitory computer-readable storage device storing a computer program, the program comprising instructions that when executed by one or more computers of a server system cause the one or more computers to perform operations comprising:
- receiving, by the one or more computers of the server system, a query from a client device of a user;
- identifying, by the one or more computers of the server system, the user that submitted the query;
- determining, by the one or more computers of the server system, that one or more terms of the query represent an alias for a user-specific geographical location that has not been designated for the identified user;
- in response to determining that the one or more terms of the query represent an alias for a user-specific location that has not been designated for the identified user, providing, by the one or more computers of the server system, data causing the client device to output a prompt to the user to specify a geographical location corresponding to the one or more query terms;
- receiving, by the one or more computers of the server system, data indicating a geographical location input in response to the prompt;
- storing, by the one or more computers of the server system, data indicating that, for the identified user, the alias corresponds to the geographical location input in response to the prompt, wherein the server system stores, for each individual user of a set of multiple users, data designating a specific geographical location that the individual user has specified as corresponding to the alias, and wherein the stored data designates different geographical locations for the same alias for different users in the set of multiple users; and
- providing, by the one or more computers of the server system and in response to the query, one or more search results responsive to the query wherein the alias corresponds to the geographical location input in response to the prompt.

22. The non-transitory computer-readable storage device of claim 21, wherein the operations further comprise:
- modifying the query to include the geographical location input in response to the prompt; and
- obtaining search results responsive to the modified query;
wherein providing, in response to the query, the one or more search results responsive to the query wherein the alias corresponds to the geographical location input in response to the prompt comprises providing one or more of the search results responsive to the modified query.

* * * * *